United States Patent
Parra et al.

(10) Patent No.: US 10,819,562 B2
(45) Date of Patent: Oct. 27, 2020

(54) CLOUD SERVICES MANAGEMENT SYSTEMS UTILIZING IN-BAND COMMUNICATION CONVEYING SITUATIONAL AWARENESS

(71) Applicant: Zscaler, Inc., San Jose, CA (US)

(72) Inventors: Eduardo Manuel Parra, Redmond, WA (US); Michael Ted Richard, Grayslake, IL (US)

(73) Assignee: Zscaler, Inc., San Jose, CA (US)

( * ) Notice: Subject to any disclaimer, the term of this patent is extended or adjusted under 35 U.S.C. 154(b) by 49 days.

(21) Appl. No.: 16/043,250

(22) Filed: Jul. 24, 2018

(65) Prior Publication Data

US 2020/0036574 A1 Jan. 30, 2020

(51) Int. Cl.
*H04L 12/46* (2006.01)
*H04L 12/24* (2006.01)
(Continued)

(52) U.S. Cl.
CPC ...... *H04L 41/0654* (2013.01); *H04L 12/4633* (2013.01); *H04L 41/0816* (2013.01);
(Continued)

(58) Field of Classification Search
CPC ......... H04L 12/00; H04L 12/02; H04L 12/16; H04L 12/28; H04L 12/46; H04L 12/4633; H04L 41/00; H04L 41/06; H04L 41/0663; H04L 41/08; H04L 41/0813; H04L 41/0816; H04L 41/0823; H04L 41/0833; H04L 41/50; H04L 41/5019; H04L 41/5035; H04L 41/5038; H04L 43/00;
(Continued)

(56) References Cited

U.S. PATENT DOCUMENTS

| 5,675,735 A * | 10/1997 | Gallagher | H04L 12/44 709/228 |
| 6,594,697 B1 * | 7/2003 | Praitis | G06F 16/957 709/225 |

(Continued)

OTHER PUBLICATIONS

RFC 792—Internet Control Message Protocol (Year: 1981).*
Wilson et al., "What protocol does the ping command use to test network connectivity", Quora, Jan. 18, 2018.*

*Primary Examiner* — Boris D Grijalva Lobos
(74) *Attorney, Agent, or Firm* — Clements Bernard Walker; Lawrence A. Baratta, Jr.

(57) ABSTRACT

A cloud system includes a plurality of cloud nodes configured to implement a cloud service which is used by a plurality of clients; a cloud management system communicatively coupled to the plurality of cloud nodes and configured to manage the plurality of cloud nodes; and a probe endpoint service executed on a cloud node, wherein a client is configured to utilize the cloud service based on a connection between the client and the cloud node executing the probe endpoint service, wherein the client is configured to execute a probe client, wherein the probe client is configured to periodically transmit probes and receive probe responses which are either empty responses denoting connectivity or a response body with maintenance or situational data contained therein, and wherein the probe client is configured to perform mitigation actions based on reception of the data.

18 Claims, 6 Drawing Sheets

(51) Int. Cl.
*H04L 12/26* (2006.01)
*H04L 12/707* (2013.01)

(52) U.S. Cl.
CPC .......... *H04L 43/0805* (2013.01); *H04L 43/12* (2013.01); *H04L 45/22* (2013.01); *H04L 2212/00* (2013.01)

(58) Field of Classification Search
CPC ... H04L 43/04; H04L 43/06; H04L 43/08–10; H04L 43/12
See application file for complete search history.

(56) References Cited

U.S. PATENT DOCUMENTS

| | | | | |
|---|---|---|---|---|
| 7,590,054 | B1* | 9/2009 | Holness | H04L 12/4633 370/225 |
| 7,752,301 | B1* | 7/2010 | Maiocco | H04L 41/064 709/224 |
| 7,801,030 | B1* | 9/2010 | Aggarwal | H04L 12/44 370/227 |
| 8,260,922 | B1* | 9/2012 | Aggarwal | H04L 45/24 709/226 |
| 8,467,324 | B2* | 6/2013 | Yousefi | H04L 67/12 370/310.2 |
| 8,806,550 | B1* | 8/2014 | Chan | H04N 17/004 725/100 |
| 8,972,569 | B1* | 3/2015 | D'Esposito | H04L 41/5067 709/224 |
| 8,990,369 | B2* | 3/2015 | Hiltunen | G06F 9/5055 709/223 |
| 9,274,902 | B1* | 3/2016 | Morley | G06F 11/0709 |
| 9,554,004 | B2* | 1/2017 | Kyoo | H04N 1/00384 |
| 9,787,559 | B1* | 10/2017 | Schroeder | H04L 41/5038 |
| 10,250,458 | B2* | 4/2019 | Loboz | G06Q 10/06393 |
| 10,313,179 | B1* | 6/2019 | Douberly | H04L 41/06 |
| 10,425,316 | B2* | 9/2019 | Yang | H04L 41/0604 |
| 10,425,507 | B2* | 9/2019 | Ponec | H04L 29/06027 |
| 2002/0143798 | A1* | 10/2002 | Lisiecki | H04L 67/1095 |
| 2003/0182410 | A1* | 9/2003 | Balan | H04L 29/06 709/223 |
| 2003/0229665 | A1* | 12/2003 | Ryman | H04L 67/24 709/203 |
| 2003/0236857 | A1* | 12/2003 | Takase | H04L 67/2804 709/217 |
| 2005/0240318 | A1* | 10/2005 | Naoi | H04L 51/04 701/1 |
| 2006/0068755 | A1* | 3/2006 | Shraim | H04L 51/12 455/410 |
| 2007/0111568 | A1* | 5/2007 | Ferrari | H04L 12/2807 439/131 |
| 2010/0042677 | A1* | 2/2010 | Ishikawa | H04L 67/14 709/203 |
| 2010/0103818 | A1* | 4/2010 | Griffith | H04L 65/80 370/235 |
| 2010/0138485 | A1* | 6/2010 | Chow | H04L 67/2842 709/203 |
| 2010/0315958 | A1* | 12/2010 | Luo | H04L 43/00 370/248 |
| 2010/0325306 | A1* | 12/2010 | Vimpari | H04L 29/12471 709/233 |
| 2011/0235549 | A1* | 9/2011 | Ahlers | H04L 41/08 370/255 |
| 2013/0136020 | A1* | 5/2013 | Chan | H04L 43/0864 370/252 |
| 2013/0268632 | A1* | 10/2013 | Baron | H04L 67/02 709/219 |
| 2015/0117197 | A1* | 4/2015 | Radulescu | H04L 43/10 370/232 |
| 2015/0150123 | A1* | 5/2015 | Be'ery | H04L 63/1416 726/22 |
| 2016/0034378 | A1* | 2/2016 | Li | G06F 11/3612 714/38.1 |
| 2016/0156484 | A1* | 6/2016 | Matsuhara | H04L 12/4633 709/227 |
| 2017/0034038 | A1* | 2/2017 | Downey | H04L 43/50 |
| 2017/0201499 | A1* | 7/2017 | McLaughlin | H04L 63/0428 |
| 2017/0222900 | A1* | 8/2017 | Kaal | H04L 43/10 |
| 2017/0278005 | A1* | 9/2017 | Cunningham | G06N 5/047 |
| 2018/0046811 | A1* | 2/2018 | Andriani | G06F 21/55 |
| 2018/0176775 | A1* | 6/2018 | Obaidi | H04W 76/10 |
| 2019/0007416 | A1* | 1/2019 | Ackley | H04L 63/104 |
| 2019/0065349 | A1* | 2/2019 | Sharma | G06F 11/3688 |

* cited by examiner

CLOUD SERVICES MANAGEMENT SYSTEMS UTILIZING IN-BAND COMMUNICATION CONVEYING SITUATIONAL AWARENESS

FIELD OF THE DISCLOSURE

The present disclosure generally relates to computer networking systems and methods. More particularly, the present disclosure relates to systems and methods for cloud management utilizing in-band communication conveying situational awareness.

BACKGROUND OF THE DISCLOSURE

Enterprise branch networks have gateway devices that straddle the border of private and public networks. These gateway devices can be routers which route and forward Internet Protocol (IP) traffic. Sometimes these gateway devices are not dedicated routers, but instead are a device with routing capabilities (e.g., a firewall with a routing feature set). In either case, these gateway devices terminate Internet connections, and serve as a border device towards the Internet. As described herein, these devices are referred to as a gateway or gateway device.

Cloud customers rely on gateway devices to transport their IP traffic towards the Internet. The gateway devices have an awareness of the local connection state, based on the local interface state (e.g., is the connection to the port up/down?). The other end of the connection (i.e., a "link"), provided by the local Internet Service Provider (ISP), typically, terminates on a router in the ISP network. If the connection between the customer and the ISP is severed, or the router on the ISP side of the connection should fail, either failure event should be detected by the customer's gateway device. If a failure occurs beyond the ISP router, these failures could be unbeknownst to the customer's gateway device. One example of a cloud service includes Security-as-a-Service provided by the Applicant, Zscaler, Inc. Various other cloud services are also contemplated herein.

Cloud customers can rely on IP tunneling mechanisms, on gateway devices, to transport customer IP traffic across the Internet to cloud provider data centers. In this disclosure, these tunnels will be referred to as overlay tunnels. The overlay tunnels used by a cloud provider can be as "point-to-point" tunnels which require two devices for establishment and operation and no more than two devices can participate in a given tunnel. IP traffic can enter a tunnel at a device referred to as a head end and exit at a device referred to as a tail end. From a tunneling standpoint, the tunnel "head-end" and the tunnel "tail-end" appear as a single logical connection between the two gateway devices. As a gateway device tunnels traffic towards the cloud provider, these IP packets may transit several intermediate devices, but, these underlying devices typically, have no knowledge of the tunnel itself. Only the two gateway devices that terminate each end of the tunnel, are aware of the tunnel, and the state of the tunnel itself (e.g., is the tunnel "up" and working, or "down" and has failed).

Most overlay tunnels require a mechanism to determine the functional "end-to-end" state of the overlay tunnel. The current "state-of-the-art" requires Enterprise Network Engineers to enable mechanisms to test the liveliness of overlay tunnels. This usually consists of a "probe" that originates from the gateway device, sent through the tunnel "head-end." Note, when this probe is sent through the tunnel, the probe is considered to be "in-band." Once the "tail-end" gateway device receives the probe, depending on where the probe end-point exists, the "tail-end" gateway device itself could be the probe "end-point." Another deployment alternative could place the probe "end-point" downstream from the "tail-end" gateway, which in this scenario, the "tail-end" device would send the probe packet out one of its local network interfaces, towards the probe "end-point." In either scenario, the placement of the probe endpoint is not relevant to this invention.

When a probe packet is received by the far-side "end-point" destination, typically, the far side "end-point" sends a response back through the tunnel, to acknowledge that the probe packet was successfully received. At a high-level, when these probe packets are sent and acknowledged successfully, the tunnel state is considered to be functional (i.e., "up"). This probe interaction can repeat at a scheduled interval, during the duration that the gateway devices are functional (e.g., every 10 seconds). At any point, if a series of consecutive probes packets should fail (not be received), usually during an unplanned outage, the overlay tunnel state will transition to "Down" (failed). This approach is highly successful in determining the liveliness of overlay tunnels amongst a variety of gateway manufacturers, and is currently used by many cloud customers today, which use a variety of gateway devices from a variety of gateway manufactures.

Disadvantageously, the conventional probe approach only conveys UP/DOWN information and not meaningful situational awareness and mitigation details.

BRIEF SUMMARY OF THE DISCLOSURE

In an embodiment, a cloud system includes a plurality of cloud nodes communicatively coupled to the Internet, wherein the plurality of cloud nodes are configured to implement a cloud service which is used by a plurality of clients; a cloud management system communicatively coupled to the plurality of cloud nodes and configured to manage the plurality of cloud nodes; and a probe endpoint service executed on a cloud node, wherein a client is configured to utilize the cloud service based on a connection between the client and the cloud node executing the probe endpoint service, wherein the client is configured to execute a probe client, wherein the probe client is configured to periodically transmit probes to the probe endpoint service and receive probe responses which are either empty responses denoting connectivity or a response body with maintenance or situational data contained therein, and wherein the probe client is configured to perform mitigation or remedial actions based on reception of the maintenance or situational data. The probe can be a Hypertext Transfer Protocol (HTTP) GET request or a POST request with a Uniform Resource Locator associated with the probe endpoint service. Optionally, the probe is a Hypertext Transfer Protocol (HTTP) GET request with a Uniform Resource Locator associated with the probe endpoint service for continuity checks with the cloud service and an HTTP POST request for obtaining maintenance or situational data from the cloud service.

The maintenance or situational data can be in a data-interexchange format that is automatically processed by the probe client. The maintenance or situational data can be related to compute, networking, storage, power, and service operation, and the probe client utilizes the maintenance or situational data to select an appropriate cloud node for connection thereto. The client can connect to the cloud service via at least two tunnels, and wherein an active tunnel of the at least two tunnels is selected based on the maintenance or situational data. The maintenance or situational data can be a scheduled maintenance event or a security event.

In another embodiment, a method implemented in a cloud system includes operating a cloud service in the cloud system used by a plurality of clients, wherein the cloud service includes a plurality of cloud nodes communicatively coupled to the Internet; managing the plurality of cloud nodes via a cloud management system which is communicatively coupled to the plurality of cloud nodes and configured to manage the plurality of cloud nodes; executing a probe endpoint service executed on a cloud node; executing a probe client on a client configured to utilize the cloud service, wherein the client has a connection to the cloud node executing the probe endpoint service; periodically transmitting probes and probe responses between the probe endpoint service and the probe client, wherein the probe responses are either empty responses denoting connectivity or a response body with maintenance or situational data contained therein; and performing mitigation or remedial actions by the probe client based on reception of the maintenance or situational data.

In a further embodiment, a cloud node in a cloud system includes a network interface, a data store, and a processor communicatively coupled to one another; and memory storing computer executable instructions, and in response to execution by the processor, the computer-executable instructions cause the processor to operate a cloud service in the cloud system used by a plurality of clients, wherein the cloud service is implemented by the cloud node and a plurality of cloud nodes communicatively coupled to the Internet, and wherein the cloud service is managed by a cloud management system which is communicatively coupled to the cloud node and the plurality of cloud nodes; execute a probe endpoint service; receive a probe from a client configured to utilize the cloud service executing a probe client, wherein the client has a connection to the cloud node executing the probe endpoint service; and transmit a probe response to the probe client in response to the probe, wherein the probe response is either an empty response denoting connectivity or a response body with maintenance or situational data contained therein configured to cause performance of mitigation or remedial actions by the probe client based on reception of the maintenance or situational data.

BRIEF DESCRIPTION OF THE DRAWINGS

The present disclosure is illustrated and described herein with reference to the various drawings, in which like reference numbers are used to denote like system components/method steps, as appropriate, and in which:

FIG. 6 is a network diagram of a network with a cloud service provider configured for Layer-7 probes to determine service availability, situational awareness, and the like.

DETAILED DESCRIPTION OF THE DISCLOSURE

Again, the present disclosure relates to systems and methods for cloud management utilizing in-band communication conveying situational awareness. The systems and methods leverage an existing in-band communication exchange between customer Internet gateways and service test endpoints (e.g., a Hypertext Transfer Protocol (HTTP) GET from customer router to cloud provider endpoint). This in-band communication exchange can embed service performance, situational, event related data and the like, i.e., information that relates to a customer's service. This data could be service-wide or specific to a customer's service instance/context. Situational and event-related data is often communicated from machine-to-humans (e.g., emails, alerts displayed at user login, etc.). In practice, an operator typically uses this data to perform a series of manual tasks in an effort to minimize service disruptions. Also, this situational and event-related data can be processed automatically to mitigate service disruption. The systems and method use an in-band communication exchange and define what data is exchanged in a machine-to-machine format.

The systems and methods are advantageous for cloud operators and Anything as a Service (XaaS) providers which offer services that make use of overlay tunnels from locations to their service. The in-band liveliness probes described herein can enhance these services. The current state of the art for XaaS and public cloud companies is to make client requests out-of-band to query for the state of a resource. The systems and methods are a building block for communicating and addressing operational and situational events.

Å 1.0 Example High-Level System Architecture—Cloud-Based Security System

Figure 1:
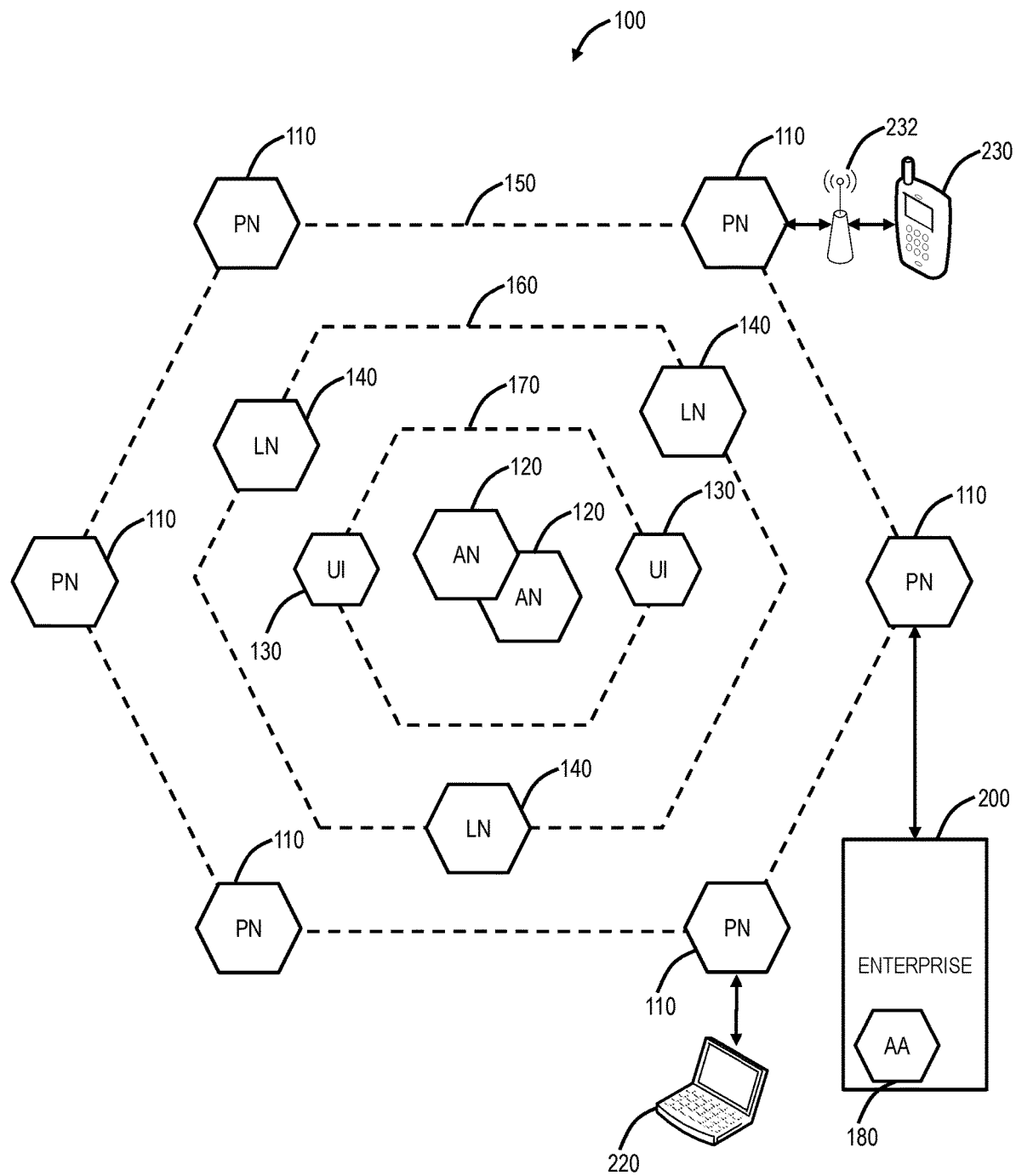
FIG. 1 is a network diagram of a distributed security system.

FIG. 1 is a block diagram of a distributed security system 100. The system 100 may, for example, be implemented as an overlay network in a wide area network (WAN), such as the Internet, a local area network (LAN), or the like. The system 100 includes processing nodes (PN) 110, that proactively detect and preclude the distribution of security threats, e.g., malware, spyware, viruses, email spam, Data Loss Prevention (DLP), content filtering, etc., and other undesirable content sent from or requested by an external system. The processing nodes 110 can also log activity and enforce policies, including logging changes to the various components and settings in the system 100. Example external systems may include an enterprise or external system 200, a computer device 220, and a mobile device 230, or other network and computing systems communicatively coupled to the system 100 including Internet of Things (IoT) devices.

In an embodiment, each of the processing nodes 110 may include a decision system, e.g., data inspection engines that operate on a content item, e.g., a web page, a file, an email message, or some other data or data communication that is sent from or requested by one of the external systems. In an embodiment, all data destined for or received from the Internet is processed through one of the processing nodes 110. In another embodiment, specific data specified by each external system, e.g., only email, only executable files, etc., is process through one of the processing node 110.

Each of the processing nodes 110 may generate a decision vector D=[d1, d2, . . . , dn] for a content item of one or more parts C=[c1, c2, . . . , cm]. Each decision vector may identify a threat classification, e.g., clean, spyware, malware, undesirable content, innocuous, spam email, unknown, etc. For example, the output of each element of the decision vector D may be based on the output of one or more data inspection engines. In an embodiment, the threat classification may be reduced to a subset of categories, e.g., violating, non-violating, neutral, unknown. Based on the subset classification, the processing node 110 may allow distribution of the content item, preclude distribution of the content item, allow distribution of the content item after a cleaning process, or perform threat detection on the content item. In an embodiment, the actions taken by one of the processing nodes 110 may be determinative on the threat classification of the content item and on a security policy of the external system to which the content item is being sent from or from which the content item is being requested by. A content item is violating if, for any part C=[c1, c2, . . . , cm] of the content item, at any of the processing nodes 110, any one of the data inspection engines generates an output that results in a classification of "violating."

Figure 3:
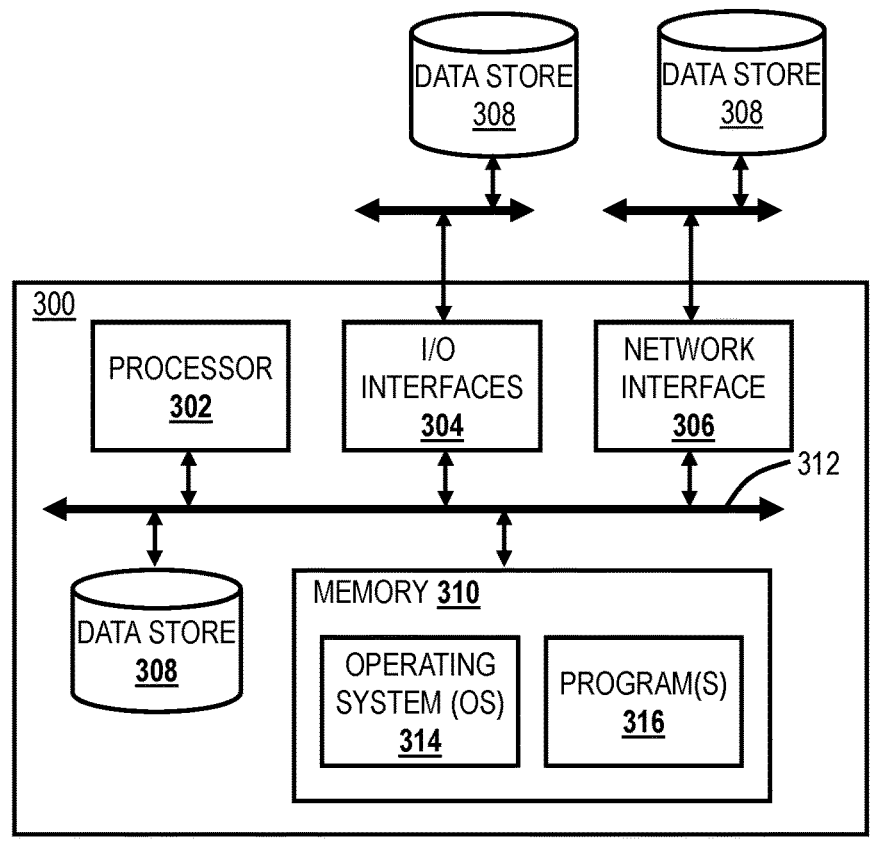
FIG. 3 is a block diagram of a server which may be used in the distributed security system of FIG. 1 or with any other cloud-based system.

Each of the processing nodes 110 may be implemented by one or more computer and communications devices, e.g., server computers, gateways, routers, switches, etc., such as the server 300 described in FIG. 3. In an embodiment, the processing nodes 110 may serve as an access layer 150. The access layer 150 may, for example, provide external system access to the security system 100. In an embodiment, each of the processing nodes 110 may include Internet gateways and one or more servers, and the processing nodes 110 may be distributed through a geographic region, e.g., throughout a country, region, campus, etc. According to a service agreement between a provider of the system 100 and an owner of an external system, the system 100 may thus provide security protection to the external system at any location throughout the geographic region.

Data communications may be monitored by the system 100 in a variety of ways, depending on the size and data requirements of the external system. For example, an enterprise 200 may have multiple routers, switches, etc. that are used to communicate over the Internet, and the routers, switches, etc. may be configured to establish communications through the nearest (in traffic communication time, for example) processing node 110. A mobile device 230 may be configured to communicate to the nearest processing node 110 through any available wireless access device, such as an access point, or a cellular gateway. A single computer device 220, such as a consumer's personal computer, may have its browser and email program configured to access the nearest processing node 110, which, in turn, serves as a proxy for the computer device 220. Alternatively, an Internet provider may have all of its customer traffic processed through the processing nodes 110.

In an embodiment, the processing nodes 110 may communicate with one or more authority nodes (AN) 120. The authority nodes 120 may store policy data for each external system and may distribute the policy data to each of the processing nodes 110. The policy may, for example, define security policies for a protected system, e.g., security policies for the enterprise 200. Example policy data may define access privileges for users, websites and/or content that is disallowed, restricted domains, etc. The authority nodes 120 may distribute the policy data to the processing nodes 110. In an embodiment, the authority nodes 120 may also distribute threat data that includes the classifications of content items according to threat classifications, e.g., a list of known viruses, a list of known malware sites, spam email domains, a list of known phishing sites, etc. The distribution of threat data between the processing nodes 110 and the authority nodes 120 may be implemented by push and pull distribution schemes described in more detail below. In an embodiment, each of the authority nodes 120 may be implemented by one or more computer and communication devices, e.g., server computers, gateways, switches, etc., such as the server 300 described in FIG. 3. In some embodiments, the authority nodes 120 may serve as an application layer 170. The application layer 170 may, for example, manage and provide policy data, threat data, and data inspection engines and dictionaries for the processing nodes 110.

Other application layer functions may also be provided in the application layer 170, such as a user interface (UI) front-end 130. The user interface front-end 130 may provide a user interface through which users of the external systems may provide and define security policies, e.g., whether email traffic is to be monitored, whether certain websites are to be precluded, etc. Another application capability that may be provided through the user interface front-end 130 is security analysis and log reporting. The underlying data on which the security analysis and log reporting functions operate are stored in logging nodes (LN) 140, which serve as a data logging layer 160. Each of the logging nodes 140 may store data related to security operations and network traffic processed by the processing nodes 110 for each external system. In an embodiment, the logging node 140 data may be anonymized so that data identifying an enterprise is removed or obfuscated. For example, identifying data may be removed to provide an overall system summary of security processing for all enterprises and users without revealing the identity of any one account. Alternatively, identifying data may be obfuscated, e.g., provide a random account number each time it is accessed, so that an overall system summary of security processing for all enterprises and users may be broken out by accounts without revealing the identity of any one account. In another embodiment, the identifying data and/or logging node 140 data may be further encrypted, e.g., so that only the enterprise (or user if a single user account) may have access to the logging node 140 data for its account. Other processes of anonymizing, obfuscating, or securing logging node 140 data may also be used. Note, as described herein, the systems and methods for tracking and auditing changes in a multi-tenant cloud system can be implemented in the data logging layer 160, for example.

In an embodiment, an access agent 180 may be included in the external systems. For example, the access agent 180 is deployed in the enterprise 200. The access agent 180 may, for example, facilitate security processing by providing a hash index of files on a client device to one of the processing nodes 110, or may facilitate authentication functions with one of the processing nodes 110, e.g., by assigning tokens for passwords and sending only the tokens to a processing node so that transmission of passwords beyond the network edge of the enterprise is minimized. Other functions and processes may also be facilitated by the access agent 180. In an embodiment, the processing node 110 may act as a forward proxy that receives user requests to external servers addressed directly to the processing node 110. In another embodiment, the processing node 110 may access user requests that are passed through the processing node 110 in a transparent mode. A protected system, e.g., enterprise 200, may, for example, choose one or both of these modes. For example, a browser may be configured either manually or through the access agent 180 to access the processing node 110 in a forward proxy mode. In the forward proxy mode, all accesses are addressed to the processing node 110.

In an embodiment, an enterprise gateway may be configured so that user requests are routed through the processing node 110 by establishing a communication tunnel between enterprise gateway and the processing node 110. For establishing the tunnel, existing protocols such as generic routing encapsulation (GRE), layer two tunneling protocol (L2TP), Internet Protocol Security (IPSec), Datagram Transport Layer Security (DTLS), or other tunneling and encapsulation techniques designed for an Internet Protocol (IP)-based underlay data plane (IP) security protocols may be used. In another embodiment, the processing nodes 110 may be deployed at Internet service provider (ISP) nodes. The ISP nodes may redirect subject traffic to the processing nodes 110 in a transparent proxy mode. Protected systems, such as the enterprise 200, may use a multiprotocol label switching (MPLS) class of service for indicating the subject traffic that is to be redirected. For example, at the within the enterprise, the access agent 180 may be configured to perform MPLS labeling. In another transparent proxy mode embodiment, a protected system, such as the enterprise 200, may identify the processing node 110 as a next hop router for communication with the external servers.

Generally, the distributed security system 100 may generally refer to a cloud-based security system. Other cloud-based security systems and generalized cloud-based systems are contemplated for the systems and methods for tracking and auditing changes in a multi-tenant cloud system. Cloud computing systems and methods abstract away physical servers, storage, networking, etc. and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's device, with no installed client version of an application required. Centralization gives cloud service providers complete control over the versions of the browser-based applications provided to clients, which removes the need for version upgrades or license management on individual client computing devices. The phrase "software as a service" (SaaS) is sometimes used to describe application programs offered through cloud computing. A common shorthand for a provided cloud computing service (or even an aggregation of all existing cloud services) is "the cloud." The distributed security system 100 is illustrated herein as one embodiment of a cloud-based system, and those of ordinary skill in the art will recognize the tracking and auditing systems and methods contemplate operation on any cloud-based system.

Å 2.0 Example Detailed System Architecture and Operation

Figure 2:
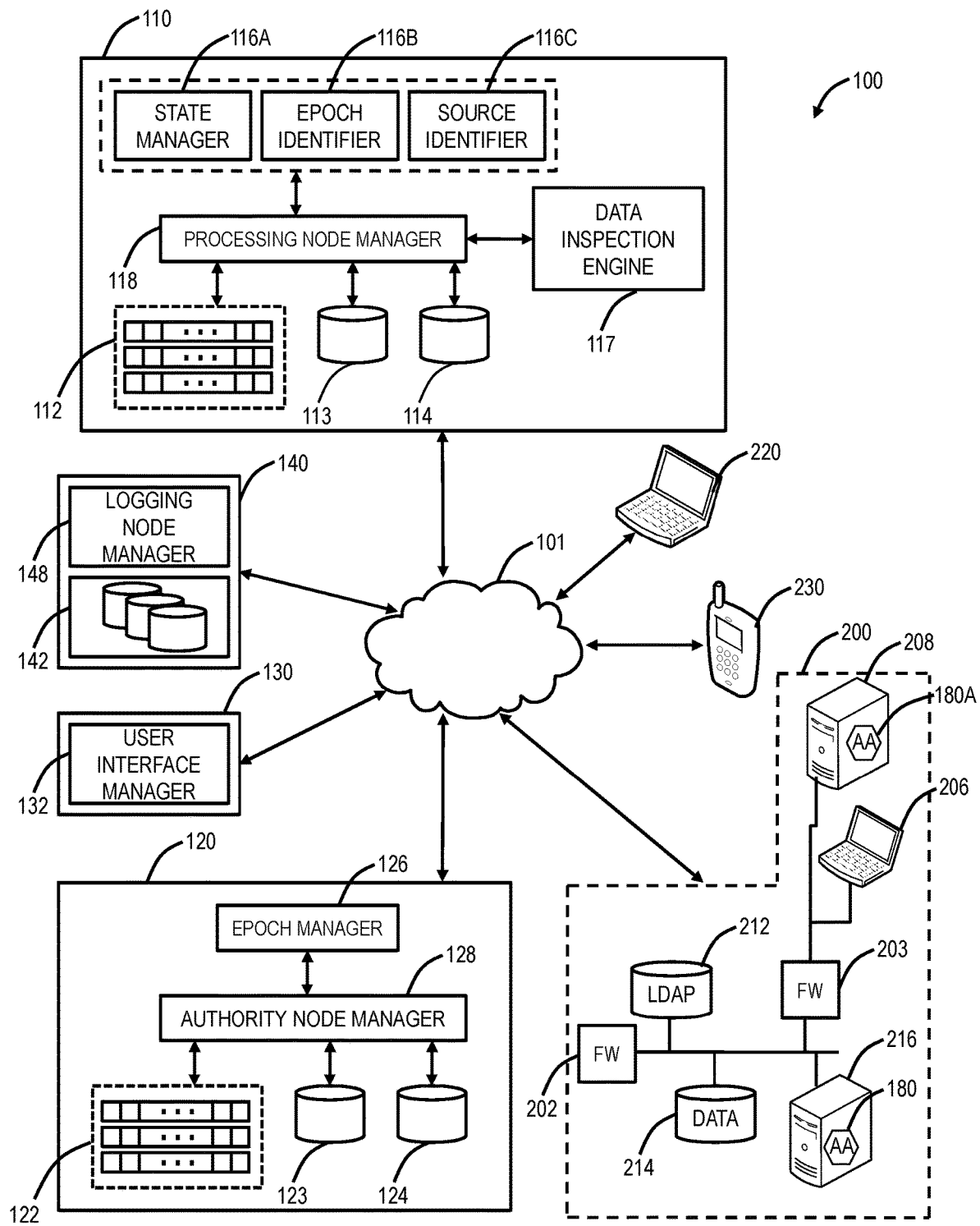
FIG. 2 is a network diagram of the distributed security system of FIG. 1 illustrating various components in more detail.

FIG. 2 is a block diagram of various components of the distributed security system 100 in more detail. Although FIG. 2 illustrates only one representative component processing node 110, authority node 120 and logging node 140, those of ordinary skill in the art will appreciate there may be many of each of the component nodes 110, 120 and 140 present in the system 100. A wide area network (WAN) 101, such as the Internet, or some other combination of wired and/or wireless networks, communicatively couples the processing node 110, the authority node 120, and the logging node 140 to one another. The external systems 200, 220 and 230 likewise communicate over the WAN 101 with each other or other data providers and publishers. Some or all of the data communication of each of the external systems 200, 220 and 230 may be processed through the processing node 110.

FIG. 2 also shows the enterprise 200 in more detail. The enterprise 200 may, for example, include a firewall (FW) 202 protecting an internal network that may include one or more enterprise servers 216, a lightweight directory access protocol (LDAP) server 212, and other data or data stores 214. Another firewall 203 may protect an enterprise subnet that can include user computers 206 and 208 (e.g., laptop and desktop computers). The enterprise 200 may communicate with the WAN 101 through one or more network devices, such as a router, gateway, switch, etc. The LDAP server 212 may store, for example, user login credentials for registered users of the enterprise 200 system. Such credentials may include user identifiers, login passwords, and a login history associated with each user identifier. The other data stores 214 may include sensitive information, such as bank records, medical records, trade secret information, or any other information warranting protection by one or more security measures.

In an embodiment, a client access agent 180a may be included on a client computer 206. The client access agent 180a may, for example, facilitate security processing by providing a hash index of files on the user computer 206 to a processing node 110 for malware, virus detection, etc. Other security operations may also be facilitated by the access agent 180a. In another embodiment, a server access agent 180 may facilitate authentication functions with the processing node 110, e.g., by assigning tokens for passwords and sending only the tokens to the processing node 110 so that transmission of passwords beyond the network edge of the enterprise 200 is minimized. Other functions and processes may also be facilitated by the server access agent 180b. The computer device 220 and the mobile device 230 may also store information warranting security measures, such as personal bank records, medical information, and login information, e.g., login information to the computers 206 of the enterprise 200, or to some other secure data provider server. The computer device 220 and the mobile device 230 can also store information warranting security measures, such as personal bank records, medical information, and login information, e.g., login information to a server 216 of the enterprise 200, or to some other secure data provider server.

Å 2.1 Example Processing Node Architecture

In an embodiment, the processing nodes 110 are external to network edges of the external systems 200, 220 and 230. Each of the processing nodes 110 stores security policy data 113 received from the authority node 120 and monitors content items requested by or sent from the external systems 200, 220 and 230. In an embodiment, each of the processing nodes 110 may also store a detection process filter 112 and/or threat data 114 to facilitate the decision of whether a content item should be processed for threat detection. A processing node manager 118 may manage each content item in accordance with the security policy data 113, and the detection process filter 112 and/or threat data 114, if stored at the processing node 110, so that security policies for a plurality of external systems in data communication with the processing node 110 are implemented external to the network edges for each of the external systems 200, 220 and 230. For example, depending on the classification resulting from the monitoring, the content item may be allowed, precluded, or threat detected. In general, content items that are already classified as "clean" or not posing a threat can be allowed, while those classified as "violating" may be precluded. Those content items having an unknown status, e.g., content items that have not been processed by the system 100, may be threat detected to classify the content item according to threat classifications.

The processing node 110 may include a state manager 116A. The state manager 116A may be used to maintain the authentication and the authorization states of users that submit requests to the processing node 110. Maintenance of the states through the state manager 116A may minimize the number of authentication and authorization transactions that are necessary to process a request. The processing node 110 may also include an epoch processor 116B. The epoch processor 116B may be used to analyze authentication data that originated at the authority node 120. The epoch processor 116B may use an epoch ID to validate further the authenticity of authentication data. The processing node 110 may further include a source processor 116C. The source processor 116C may be used to verify the source of authorization and authentication data. The source processor 116C may identify improperly obtained authorization and authentication data, enhancing the security of the network. Collectively, the state manager 116A, the epoch processor 116B, and the source processor 116C operate as data inspection engines.

Because the amount of data being processed by the processing nodes 110 may be substantial, the detection processing filter 112 may be used as the first stage of an information lookup procedure. For example, the detection processing filter 112 may be used as a front-end to a look-up of the threat data 114. Content items may be mapped to index values of the detection processing filter 112 by a hash function that operates on an information key derived from the information item. The information key is hashed to generate an index value (i.e., a bit position). A value of zero in a bit position in the guard table can indicate, for example, the absence of information, while a one in that bit position can indicate the presence of information. Alternatively, a one could be used to represent absence, and a zero to represent presence. Each content item may have an information key that is hashed. For example, the processing node manager 118 may identify the Uniform Resource Locator (URL) address of URL requests as the information key and hash the URL address; or may identify the file name and the file size of an executable file information key and hash the file name and file size of the executable file. Hashing an information key to generate an index and checking a bit value at the index in the detection processing filter 112 generally requires less processing time than actually searching threat data 114. The use of the detection processing filter 112 may improve the failure query (i.e., responding to a request for absent information) performance of database queries and/or any general information queries. Because data structures are generally optimized to access information that is present in the structures, failure query performance has a greater effect on the time required to process information searches for very rarely occurring items, e.g., the presence of file information in a virus scan log or a cache where many or most of the files transferred in a network have not been scanned or cached. Using the detection processing filter 112. However, the worst case additional cost is only on the order of one, and thus its use for most failure queries saves on the order of m log m, where m is the number of information records present in the threat data 114.

The detection processing filter 112 thus improves the performance of queries where the answer to a request for information is usually positive. Such instances may include, for example, whether a given file has been virus scanned, whether content at a given URL has been scanned for inappropriate (e.g., pornographic) content, whether a given fingerprint matches any of a set of stored documents, and whether a checksum corresponds to any of a set of stored documents. Thus, if the detection processing filter 112 indicates that the content item has not been processed, then a worst-case null lookup operation into the threat data 114 is avoided, and a threat detection can be implemented immediately. The detection processing filter 112 thus complements the threat data 114 that capture positive information. In an embodiment, the detection processing filter 112 may be a Bloom filter implemented by a single hash function. The Bloom filter may be sparse table, i.e., the tables include many zeros and few ones, and the hash function is chosen to minimize or eliminate false negatives which are, for example, instances where an information key is hashed to a bit position and that bit position indicates that the requested information is absent when it is actually present.

Å 2.2 Example Authority Node Architecture

In general, the authority node 120 includes a data store that stores master security policy data 123 for each of the external systems 200, 220 and 230. An authority node manager 128 may be used to manage the master security policy data 123, e.g., receive input from users of each of the external systems defining different security policies and may distribute the master security policy data 123 to each of the processing nodes 110. The processing nodes 110 then store a local copy of the security policy data 113. The authority node 120 may also store a master detection process filter 122. The detection processing filter 122 may include data indicating whether content items have been processed by one or more of the data inspection engines 116 in any of the processing nodes 110. The authority node manager 128 may be used to manage the master detection processing filter 122, e.g., receive updates from processing nodes 110 when the processing node 110 has processed a content item and update the master detection processing filter 122. For example, the master detection processing filter 122 may be distributed to the processing nodes 110, which then store a local copy of the detection processing filter 112.

In an embodiment, the authority node 120 may include an epoch manager 126. The epoch manager 126 may be used to generate authentication data associated with an epoch ID. The epoch ID of the authentication data is a verifiable attribute of the authentication data that can be used to identify fraudulently created authentication data. In an embodiment, the detection processing filter 122 may be a guard table. The processing node 110 may, for example, use the information in the local detection processing filter 112 to quickly determine the presence and/or absence of information, e.g., whether a particular URL has been checked for malware; whether a particular executable has been virus scanned; etc. The authority node 120 may also store master threat data 124. The master threat data 124 may classify content items by threat classifications, e.g., a list of known viruses, a list of known malware sites, spam email domains, list of known or detected phishing sites, etc. The authority node manager 128 may be used to manage the master threat data 124, e.g., receive updates from the processing nodes 110 when one of the processing nodes 110 has processed a content item and update the master threat data 124 with any pertinent results. In some implementations, the master threat data 124 may be distributed to the processing nodes 110, which then store a local copy of the threat data 114. In another embodiment, the authority node 120 may also monitor the health of each of the processing nodes 110, e.g., the resource availability in each of the processing nodes 110, detection of link failures, etc. Based on the observed health of each of the processing nodes 110, the authority node 120 may redirect traffic among the processing nodes 110 and/or balance traffic among the processing nodes 110. Other remedial actions and processes may also be facilitated by the authority node 120.

Å 2.3 Example Processing Node and Authority Node Communications

The processing node 110 and the authority node 120 may be configured according to one or more push and pull processes to manage content items according to security policy data 113 and/or 123, detection process filters 112 and/or 122, and the threat data 114 and/or 124. In a threat data push implementation, each of the processing nodes 110 stores policy data 113 and threat data 114. The processing node manager 118 determines whether a content item requested by or transmitted from an external system is classified by the threat data 114. If the content item is determined to be classified by the threat data 114, then the processing node manager 118 may manage the content item according to the security classification of the content item and the security policy of the external system. If, however, the content item is determined not to be classified by the threat data 114, then the processing node manager 118 may cause one or more of the data inspection engines 117 to perform the threat detection processes to classify the content item according to a threat classification. Once the content item is classified, the processing node manager 118 generates a threat data update that includes data indicating the threat classification for the content item from the threat detection process and transmits the threat data update to an authority node 120.

The authority node manager 128, in response to receiving the threat data update, updates the master threat data 124 stored in the authority node data store according to the threat data update received from the processing node 110. In an embodiment, the authority node manager 128 may automatically transmit the updated threat data to the other processing nodes 110. Accordingly, threat data for new threats as the new threats are encountered are automatically distributed to each processing node 110. Upon receiving the new threat data from the authority node 120, each of processing node managers 118 may store the updated threat data in the locally stored threat data 114.

In a threat data pull and push implementation, each of the processing nodes 110 stores policy data 113 and threat data 114. The processing node manager 118 determines whether a content item requested by or transmitted from an external system is classified by the threat data 114. If the content item is determined to be classified by the threat data 114, then the processing node manager 118 may manage the content item according to the security classification of the content item and the security policy of the external system. If, however, the content item is determined not to be classified by the threat data, then the processing node manager 118 may request responsive threat data for the content item from the authority node 120. Because processing a content item may consume valuable resource and time, in some implementations the processing node 110 may first check with the authority node 120 for threat data 114 before committing such processing resources.

The authority node manager 128 may receive the responsive threat data request from the processing node 110 and may determine if the responsive threat data is stored in the authority node data store. If responsive threat data is stored in the master threat data 124, then the authority node manager 128 provide a reply that includes the responsive threat data to the processing node 110 so that the processing node manager 118 may manage the content item in accordance with the security policy data 113 and the classification of the content item. Conversely, if the authority node manager 128 determines that responsive threat data is not stored in the master threat data 124, then the authority node manager 128 may provide a reply that does not include the responsive threat data to the processing node 110. In response, the processing node manager 118 can cause one or more of the data inspection engines 116 to perform the threat detection processes to classify the content item according to a threat classification. Once the content item is classified, the processing node manager 118 generates a threat data update that includes data indicating the threat classification for the content item from the threat detection process and transmits the threat data update to an authority node 120. The authority node manager 128 can then update the master threat data 124. Thereafter, any future requests related to responsive threat data for the content item from other processing nodes 110 can be readily served with responsive threat data.

In a detection process filter and threat data push implementation, each of the processing nodes 110 stores a detection process filter 112, policy data 113, and threat data 114. The processing node manager 118 accesses the detection process filter 112 to determine whether the content item has been processed. If the processing node manager 118 determines that the content item has been processed, it may determine if the content item is classified by the threat data 114. Because the detection process filter 112 has the potential for a false positive, a lookup in the threat data 114 may be implemented to ensure that a false positive has not occurred. The initial check of the detection process filter 112, however, may eliminate many null queries to the threat data 114, which, in turn, conserves system resources and increases efficiency. If the content item is classified by the threat data 114, then the processing node manager 118 may manage the content item in accordance with the security policy data 113 and the classification of the content item. Conversely, if the processing node manager 118 determines that the content item is not classified by the threat data 114, or if the processing node manager 118 initially determines through the detection process filter 112 that the content item is not classified by the threat data 114, then the processing node manager 118 may cause one or more of the data inspection engines 116 to perform the threat detection processes to classify the content item according to a threat classification. Once the content item is classified, the processing node manager 118 generates a threat data update that includes data indicating the threat classification for the content item from the threat detection process and transmits the threat data update to one of the authority nodes 120.

The authority node manager 128, in turn, may update the master threat data 124 and the master detection process filter 122 stored in the authority node data store according to the threat data update received from the processing node 110. In an embodiment, the authority node manager 128 may automatically transmit the updated threat data and detection processing filter to other processing nodes 110. Accordingly, threat data and the detection processing filter for new threats as the new threats are encountered are automatically distributed to each processing node 110, and each processing node 110 may update its local copy of the detection processing filter 112 and threat data 114.

In a detection process filter and threat data pull and push implementation, each of the processing nodes 110 stores a detection process filter 112, policy data 113, and threat data 114. The processing node manager 118 accesses the detection process filter 112 to determine whether the content item has been processed. If the processing node manager 118 determines that the content item has been processed, it may determine if the content item is classified by the threat data 114. Because the detection process filter 112 has the potential for a false positive, a lookup in the threat data 114 can be implemented to ensure that a false positive has not occurred. The initial check of the detection process filter 112, however, may eliminate many null queries to the threat data 114, which, in turn, conserves system resources and increases efficiency. If the processing node manager 118 determines that the content item has not been processed, it may request responsive threat data for the content item from the authority node 120. Because processing a content item may consume valuable resource and time, in some implementations the processing node 110 may first check with the authority node 120 for threat data 114 before committing such processing resources.

The authority node manager 128 may receive the responsive threat data request from the processing node 110 and may determine if the responsive threat data is stored in the authority node data 120 store. If responsive threat data is stored in the master threat data 124, then the authority node manager 128 provides a reply that includes the responsive threat data to the processing node 110 so that the processing node manager 118 can manage the content item in accordance with the security policy data 112 and the classification of the content item, and further update the local detection processing filter 112. Conversely, if the authority node manager 128 determines that responsive threat data is not stored in the master threat data 124, then the authority node manager 128 may provide a reply that does not include the responsive threat data to the processing node 110. In response, the processing node manager 118 may cause one or more of the data inspection engines 116 to perform the threat detection processes to classify the content item according to a threat classification. Once the content item is classified, the processing node manager 118 generates a threat data update that includes data indicating the threat classification for the content item from the threat detection process and transmits the threat data update to an authority node 120. The authority node manager 128 may then update the master threat data 124. Thereafter, any future requests for related to responsive threat data for the content item from other processing nodes 110 can be readily served with responsive threat data.

The various push and pull data exchange processes provided above are example processes for which the threat data and/or detection process filters may be updated in the system 100 of FIGS. 1 and 2. Other update processes, however, are contemplated herein. The data inspection engines 116, processing node manager 118, authority node manager 128, user interface manager 132, logging node manager 148, and authority agent 180 may be realized by instructions that upon execution cause one or more processing devices to carry out the processes and functions described above. Such instructions can, for example, include interpreted instructions, such as script instructions, e.g., JavaScript or ECMAScript instructions, or executable code, or other instructions stored in a non-transitory computer-readable medium. Other processing architectures can also be used, e.g., a combination of specially designed hardware and software, for example.

Å 3.0 Example Server Architecture

FIG. 3 is a block diagram of a server 300 which may be used in the system 100, in other systems, or standalone. Any of the processing nodes 110, the authority nodes 120, and the logging nodes 140 may be formed through one or more servers 300. Further, the computer device 220, the mobile device 230, the servers 208, 216, etc. may include the server 300 or similar structure. The server 300 may be a digital computer that, in terms of hardware architecture, generally includes a processor 302, input/output (I/O) interfaces 304, a network interface 306, a data store 308, and memory 310. It should be appreciated by those of ordinary skill in the art that FIG. 3 depicts the server 300 in an oversimplified manner, and a practical embodiment may include additional components and suitably configured processing logic to support known or conventional operating features that are not described in detail herein. The components (302, 304, 306, 308, and 310) are communicatively coupled via a local interface 312. The local interface 312 may be, for example, but not limited to, one or more buses or other wired or wireless connections, as is known in the art. The local interface 312 may have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 may be any custom made or commercially available processor, a central processing unit (CPU), an auxiliary processor among several processors associated with the server 300, a semiconductor-based microprocessor (in the form of a microchip or chip set), or generally any device for executing software instructions. When the server 300 is in operation, the processor 302 is configured to execute software stored within the memory 310, to communicate data to and from the memory 310, and to generally control operations of the server 300 pursuant to the software instructions. The I/O interfaces 304 may be used to receive user input from and/or for providing system output to one or more devices or components. User input may be provided via, for example, a keyboard, touchpad, and/or a mouse. System output may be provided via a display device and a printer (not shown). I/O interfaces 304 may include, for example, a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

The network interface 306 may be used to enable the server 300 to communicate over a network, such as the Internet, the WAN 101, the enterprise 200, and the like, etc. The network interface 306 may include, for example, an Ethernet card or adapter (e.g., 10BaseT, Fast Ethernet, Gigabit Ethernet, 10GbE) or a wireless local area network (WLAN) card or adapter (e.g., 802.11a/b/g/n). The network interface 306 may include address, control, and/or data connections to enable appropriate communications on the network. A data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media. In one example, the data store 1208 may be located internal to the server 300 such as, for example, an internal hard drive connected to the local interface 312 in the server 300. Additionally, in another embodiment, the data store 308 may be located external to the server 300 such as, for example, an external hard drive connected to the I/O interfaces 304 (e.g., SCSI or USB connection). In a further embodiment, the data store 308 may be connected to the server 300 through a network, such as, for example, a network attached file server.

The memory 310 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 310 may incorporate electronic, magnetic, optical, and/or other types of storage media. Note that the memory 310 may have a distributed architecture, where various components are situated remotely from one another, but can be accessed by the processor 302. The software in memory 310 may include one or more software programs, each of which includes an ordered listing of executable instructions for implementing logical functions. The software in the memory 310 includes a suitable operating system (O/S) 314 and one or more programs 316. The operating system 314 essentially controls the execution of other computer programs, such as the one or more programs 316, and provides scheduling, input-output control, file and data management, memory management, and communication control and related services. The one or more programs 316 may be configured to implement the various processes, algorithms, methods, techniques, etc. described herein.

Å 4.0 Example Mobile Device Architecture

Figure 4:
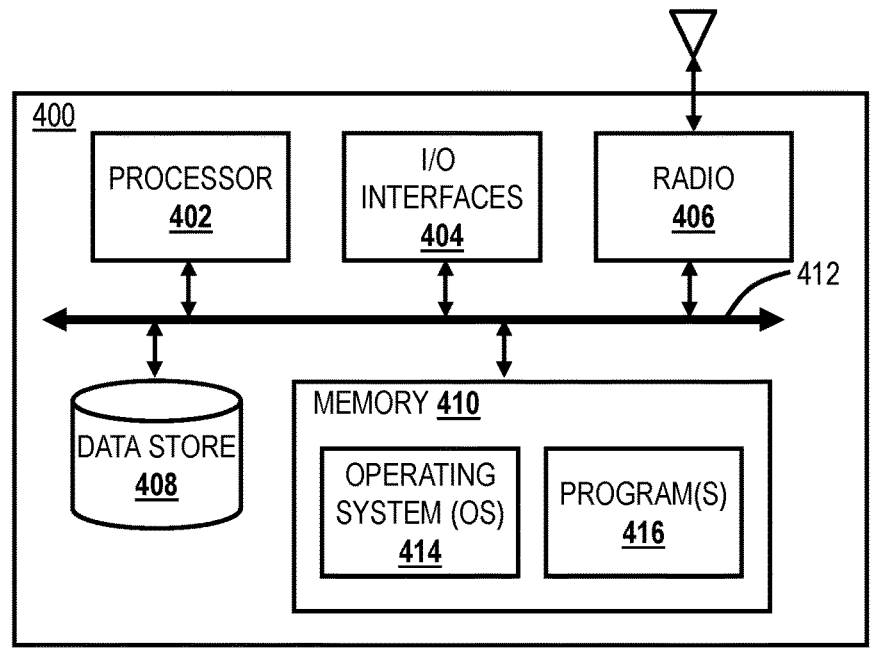
FIG. 4 is a block diagram of a mobile device which may be used in the system of FIG. 1 or with any other cloud-based system.

FIG. 4 is a block diagram of a mobile device 400, which may be used in the system 100 or the like. The mobile device 400 can be a digital device that, in terms of hardware architecture, generally includes a processor 402, input/output (I/O) interfaces 404, a radio 406, a data store 408, and memory 410. It should be appreciated by those of ordinary skill in the art that FIG. 4 depicts the mobile device 400 in an oversimplified manner, and a practical embodiment may include additional components and suitably configured processing logic to support known or conventional operating features that are not described in detail herein. The components (402, 404, 406, 408, and 402) are communicatively coupled via a local interface 412. The local interface 412 can be, for example, but not limited to, one or more buses or other wired or wireless connections, as is known in the art. The local interface 412 can have additional elements, which are omitted for simplicity, such as controllers, buffers (caches), drivers, repeaters, and receivers, among many others, to enable communications. Further, the local interface 412 may include address, control, and/or data connections to enable appropriate communications among the aforementioned components.

The processor 402 is a hardware device for executing software instructions. The processor 402 can be any custom made or commercially available processor, a central processing unit (CPU), an auxiliary processor among several processors associated with the mobile device 400, a semiconductor-based microprocessor (in the form of a microchip or chip set), or generally any device for executing software instructions. When the mobile device 400 is in operation, the processor 402 is configured to execute software stored within the memory 410, to communicate data to and from the memory 410, and to generally control operations of the mobile device 400 pursuant to the software instructions. In an embodiment, the processor 402 may include an optimized mobile processor such as optimized for power consumption and mobile applications. The I/O interfaces 404 can be used to receive user input from and/or for providing system output. User input can be provided via, for example, a keypad, a touch screen, a scroll ball, a scroll bar, buttons, barcode scanner, and the like. System output can be provided via a display device such as a liquid crystal display (LCD), touch screen, and the like. The I/O interfaces 404 can also include, for example, a serial port, a parallel port, a small computer system interface (SCSI), an infrared (IR) interface, a radio frequency (RF) interface, a universal serial bus (USB) interface, and the like. The I/O interfaces 404 can include a graphical user interface (GUI) that enables a user to interact with the mobile device 400. Additionally, the I/O interfaces 404 may further include an imaging device, i.e. camera, video camera, etc.

The radio 406 enables wireless communication to an external access device or network. Any number of suitable wireless data communication protocols, techniques, or methodologies can be supported by the radio 406, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; Long Term Evolution (LTE); cellular/wireless/cordless telecommunication protocols (e.g. 3G/4G, etc.); wireless home network communication protocols; paging network protocols; magnetic induction; satellite data communication protocols; wireless hospital or health care facility network protocols such as those operating in the WMTS bands; GPRS; proprietary wireless data communication protocols such as variants of Wireless USB; and any other protocols for wireless communication. The data store 408 may be used to store data. The data store 408 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 408 may incorporate electronic, magnetic, optical, and/or other types of storage media.

The memory 410 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 410 may incorporate electronic, magnetic, optical, and/or other types of storage media. Note that the memory 410 may have a distributed architecture, where various components are situated remotely from one another, but can be accessed by the processor 402. The software in memory 410 can include one or more software programs, each of which includes an ordered listing of executable instructions for implementing logical functions. In the example of FIG. 4, the software in the memory 410 includes a suitable operating system (O/S) 414 and programs 416. The operating system 414 essentially controls the execution of other computer programs and provides scheduling, input-output control, file and data management, memory management, and communication control and related services. The programs 416 may include various applications, add-ons, etc. configured to provide end-user functionality with the mobile device 400. For example, example programs 416 may include, but not limited to, a web browser, social networking applications, streaming media applications, games, mapping and location applications, electronic mail applications, financial applications, and the like. In a typical example, the end user typically uses one or more of the programs 416 along with a network such as the system 100.

Å 5.0 Example General Cloud System

Figure 5:
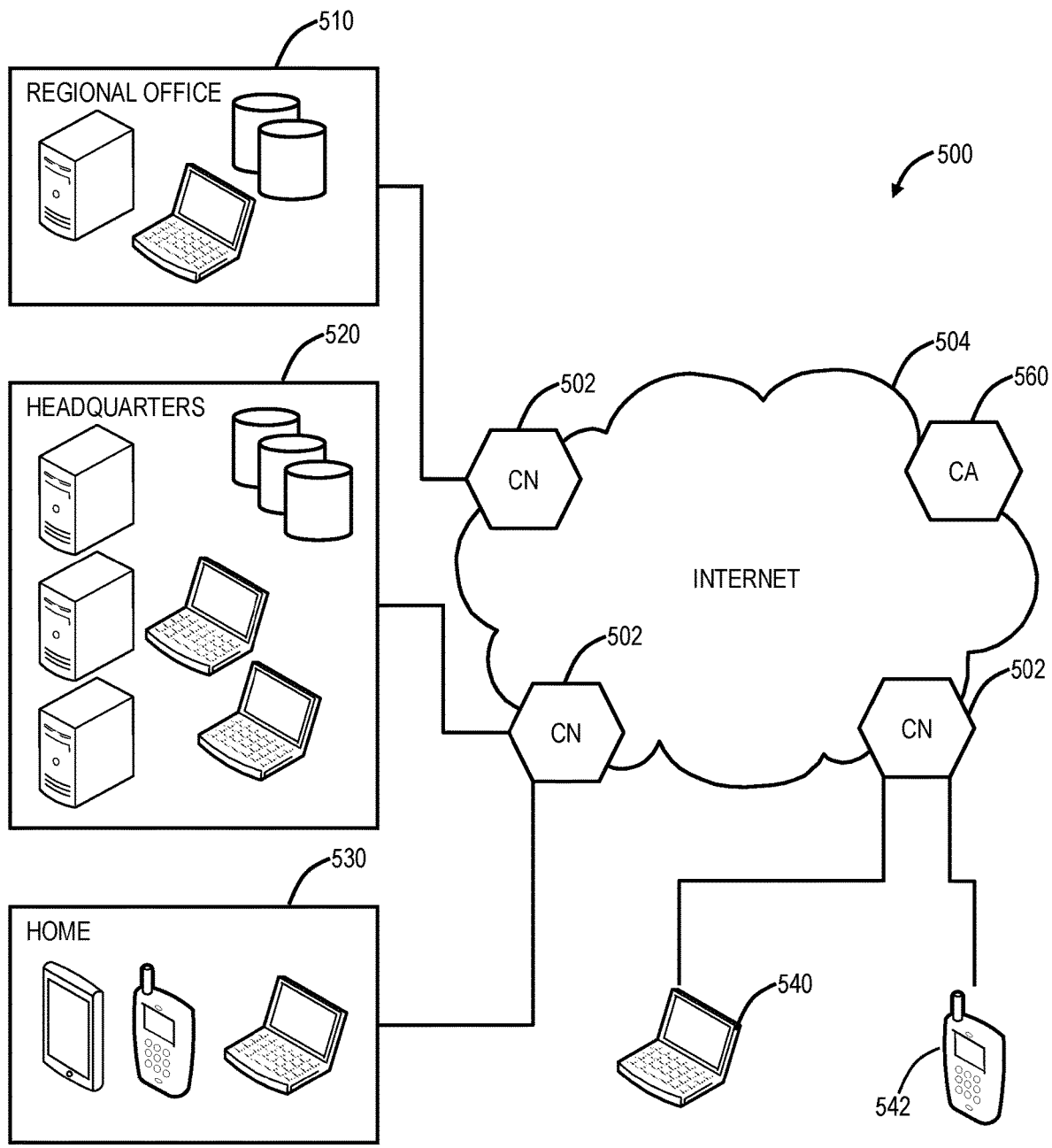
FIG. 5 is a network diagram of a generalized cloud-based system.

FIG. 5 is a block diagram of a cloud system 500 for implementing the systems and methods described herein. The cloud system 500 includes one or more cloud nodes (CN) 502 communicatively coupled to the Internet 504. The cloud nodes 502 may include the processing nodes 110, the server 300, or the like. That is, the cloud system 500 may include the distributed security system 100 or another implementation of a cloud0based system, such as a system providing different functionality from security. In the cloud system 500, traffic from various locations (and various devices located therein) such as a regional office 510, headquarters 520, various employee's homes 530, mobile laptop 540, and mobile device 542 communicates to the cloud through the cloud nodes 502. That is; each of the locations 510, 520, 530, 540, 542 is communicatively coupled to the Internet 504 through the cloud nodes 502. For security, the cloud system 500 may be configured to perform various functions such as spam filtering, uniform resource locator (URL) filtering, antivirus protection, bandwidth control, data loss prevention, zero-day vulnerability protection, web 2.0 features, and the like. In an embodiment, the cloud system 500 and the distributed security system 100 may be viewed as Security-as-a-Service through the cloud. In general, the cloud system 500 can be configured to perform any function in a multi-tenant environment. For example, the cloud system 500 can provide content, a collaboration between users, storage, application hosting, and the like.

In an embodiment, the cloud system 500 can utilize the systems and methods for tracking and auditing changes in a multi-tenant cloud system. That is, the cloud system 500 can track and audit administrator activity associated with the cloud system 500 in a segregated and overlaid fashion from the application functions performed by the cloud system 500. This segregated and overlaid fashion decouples the tracking and auditing from application logic, maximizing resources and minimizing development complexity and runtime processing. The cloud system 500 (and the system 100) can be offloaded from complex tracking and auditing functions so that it can provide its primary function. In the context of a distributed security system, the tracking and auditing systems and methods enable accountability, intrusion detection, problem diagnosis, and data reconstruction, all in an optimized fashion considering the exponential growth in cloud-based systems.

Å 6.0 Maintenance and Situational Awareness

Almost all Internet services, irrespective of type (e.g., ISP, Cloud Service Provider, Colocation Provider, etc.), require scheduled downtime for maintenance (e.g. to upgrade software and reboot devices). For scheduled maintenance, the current "state of the art" consists of service providers, of various types, communicating: 1) The date of when the maintenance will occur; 2) The time when the maintenance will start; 3) The time when the maintenance will end; and 4) The expected service impact and/or expected service degradation during this period.

These data points are communicated using email notifications, alerts upon customer login, and/or Short Message Service (SMS) messages, i.e., out-of-band. The time frame for planned maintenance is often during "off-hours" (e.g., Sunday at midnight until 4 am within the local time zone). These notifications are not reliable, nor is the handling of these notifications. For example, the recipient of the notification could be on vacation, or the recipient is an account payable contact, who signed the contract, but has no involvement in operations. Regardless, if these notifications are not received or shared with operation teams, a planned service outage can appear as an "unplanned outage." Operation staff, that is on-call, could be engaged to triage an unbeknownst event, as a "real outage."

Other types of events may also cause a service provider to send situational-based notices. For example, normal outages, capacity issues, severe weather, natural disasters, prolonged power outages, etc. The severity of these events could also be subject to sudden changes. At the onset of these events, it can be advantageous to detour around service areas that may be impacted, or disable outage alarming and escalations, knowing that the likelihood of service disruption is imminent. Another factor to consider is support staff may not always be privy to local situational events. For example, a typhoon close to Hong Kong may have limited news coverage within North America.

Figure 6:
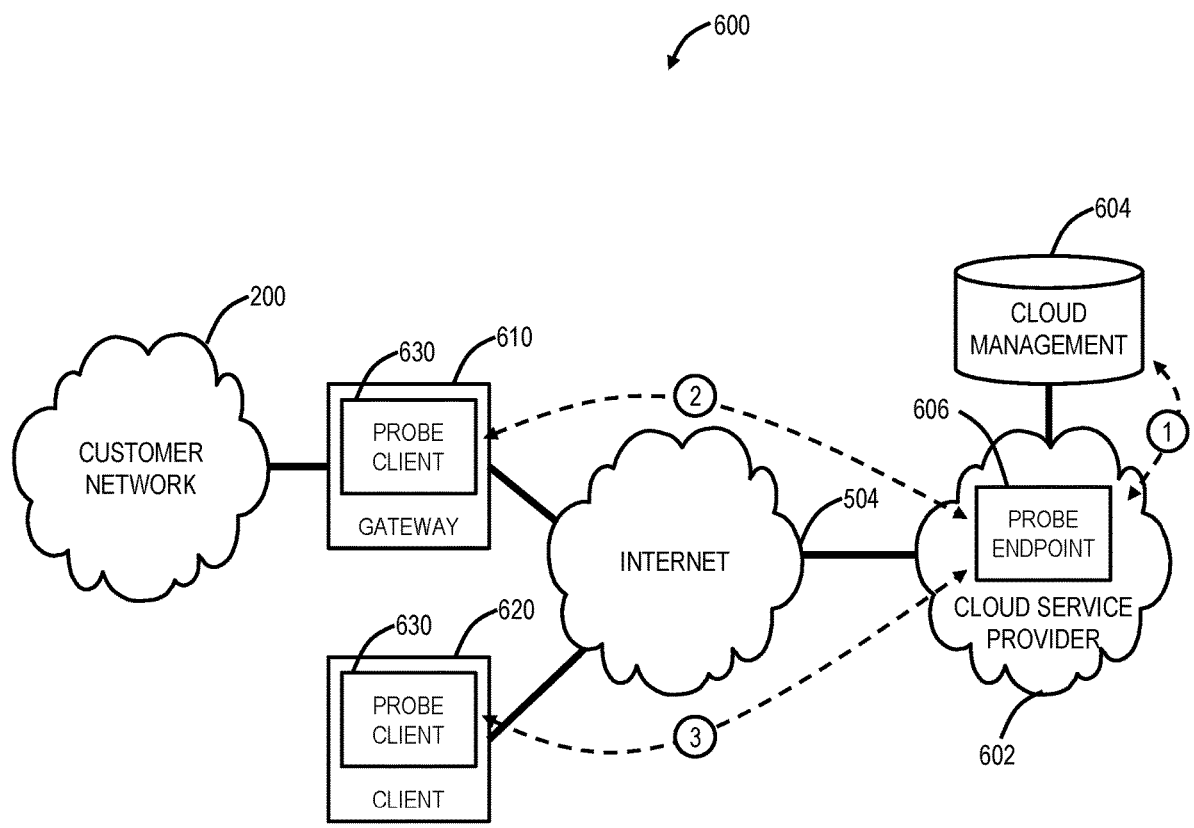

Å 6.1 Probe Endpoints to Determine Service Availability, Situational Awareness, and Mitigation FIG. 6 is a network diagram of a network 600 with a cloud service provider 602 configured for Layer-7 probes to determine service availability, situational awareness, and the like. The network 600 is presented for describing the systems and methods for cloud management utilizing in-band communication conveying situational awareness. Those skilled in the art will recognize other network configurations are also contemplated. The network 600 includes a cloud service provider 602 which can include the distributed security system 100, the cloud system 500, or the like. The cloud service provider 602 is communicatively coupled to the Internet 504 and can include a cloud management system 604 and a probe endpoint 606. For illustration purposes, the network 600 also includes the external system 200 which is a customer network and includes a gateway 610 (which can include the firewall 202) between the external system 200 and the Internet 504. Also, a client device 620 is also illustrated communicatively coupled to the Internet 504. Each of the gateway 610, the client device 620, and other devices can include a probe client 630.

The systems and methods allow the probe endpoint 606 to convey situational awareness and mitigation details to the probe clients 630. The probe endpoint 606 and the probe clients 630 exchange Layer 7 probes between one another. The probes can be a Hypertext Transfer Protocol (HTTP) GET request. The HTTP GET is used to request data from a specified resource. For example, the probe client 630 can send an HTTP GET request to the probe endpoint 606 and the probe endpoint 606 can respond with an empty body message with a successful status code (e.g., HTTP 200 code). Other probes could be used such as an HTTP POST request or the like.

The probe endpoint 606 is a service which can be executed on the cloud node 502, the processing node 110, etc. Similarly, the probe client 630 is also a service which can be executed on the gateway 610, the client device 620, or the like.

The systems and methods enable the cloud service provider 602 to pass maintenance and situational data from the probe endpoint 606 to the probe client 630. The maintenance and situational data can be relayed in the body of the HTTP GET response. Specifically, the cloud service provider 602 and the probe endpoint 606 can be communicatively coupled to the cloud management system 604 (step 1) for communication data.

The gateway 610 or the client device 620 can be configured to operate with the cloud service provider 602. As part of obtaining service through the cloud service provider 602, the gateway 610 or the client device 620 can periodically send probes, i.e., HTTP GET requests, to the probe endpoint 606 (steps 2 and 3) for determining the health and status of the connection with the cloud service provider 602. The probes can serve multiple purposes including ensuring service continuity to the cloud service provider 602, conveying situational awareness (e.g., a particular cloud node 502 is going down, connect to a different cloud node 502, etc.), and the like.

Subsequent to sending a probe, the probe client 630 expects to receive only one of the following 1) an empty body response with successful HTTP status code (Status code 200), or 2) maintenance or situational data, in some data-interexchange format, within the HTTP response body, with a successful HTTP status code (Status code 200). This maintenance or situational data is used by the gateway 610 or the client device 620. Specifically, the maintenance or situational data can be processed locally, relayed to a centralized authority, or both.

In an embodiment, the probe client 630 can send probes periodically at set intervals, e.g., every X seconds (X being an integer). The probe client 630 expects the empty body response with the successful HTTP status code which indicates the connection (tunnel) to the cloud service provider 602 is operational. In one example, the probe endpoint 606 may be configured to note a future outage, e.g., the tunnel will be down tonight at midnight to 3 am. Here, the probe endpoint 606 can send this maintenance or situational data within the HTTP response body. The probe client 630 can process this information (e.g., automatically configure another tunnel during this downtime, configure a switch to another tunnel during this downtime, etc.).

The information can also include the probe endpoint 606, i.e., the cloud service provider 602, providing instructions, guidance, etc. to the probe client 630, e.g., instructing the probe client 630 as to where to build a backup tunnel, etc. Also, the probe client 630 can provide this information to a central authority, to a user, etc., such as via a notification. In another example, the tunnel between the probe client 630 and the probe endpoint 606 may be down which results in no response from the probe endpoint 606. The probe client 630 can be configured to declare the tunnel or connection to the cloud service provider 606 down after a certain number of non-responses to a probe. At this point, the probe client 630 can cause a switch to a different tunnel or connection. In a further embodiment, performance issues can be detected, e.g., latency, packet loss, etc. between the probe client 630 and the probe endpoint 606. The performance issues can be detected by the probe client 630 via monitoring packet Round Trip Time (RTT), losing probes, etc. The probe client 630 can inform the probe endpoint 606 of such performance issues, such as via a POST message.

In an embodiment, the connection between the gateway 610 or the client device 620 and the cloud service provider 602 can be a tunnel. The tunnel can be Internet Protocol (IP)-based, e.g., IPSec, GRE, IP-in-IP, etc. Also, the connection can include two tunnels including a working and backup (or load shared). In the case of working and backup, the maintenance or situational data or the failure to receive probes can be used to cause a switch between tunnels.

Because test probes could be sent at a frequent basis, the proposed behavior could be sent by request only. For example, the probe client 630 could use HTTP GET regularly for a continuity check, and at a less frequent basis, the probe client 630 could send an HTTP POST, or another HTTP method, to request maintenance and/or situational data on demand. In another embodiment, the probe client 630 can use the maintenance or situational data to select a specific cloud node 502 or processing node 110 to connect with.

In a further embodiment, the probe could use HTTP headers. For example, WWW-Authenticate and Authorization HTTP headers could be used to authenticate the endpoints (with or without cookies).

The maintenance or situational data is included in the HTTP response body. The probe endpoint 606 can obtain status for the maintenance or situational data from the cloud management system 604.

The probe endpoint 606 may communicate any combination of the following data points, in some data-interexchange format, but not limited to:

Compute (Central Processing Unit (CPU), Graphics Processing Unit (GPU), component interconnects).
    Active Aggregate CPU utilization
    Active CPU core utilization (per physical CPU)
    Active CPU threads
    CPU temperature
    Bus/component interconnect bandwidth utilization
    Mainboard sensors
    CPU fan speeds
    GPU Name, UUID, total memory, used memory, free memory, available memory, temperature, fan speed, GPU utilization percentage, power draw, power limits, the number of active processes, . . . etc.

Networking:
    Active IP flows
    Active PPS (Packets Per Second)
    Active consumed and/or available bandwidth
    Active buffer utilization and/or available buffer
    Packet Processing Engine CPU, Memory, and buffers Storage:
    Average write latency
    Average read latency
    Remaining capacity Power/Cooling:
    Power utilization
        Voltage
        AMPs Fan speeds
Service:
Active users/subscribers
Available user/subscriber capacity In an embodiment, these data points are sent in a consolidated or abstracted manner. For example, the consolidated manner can be some data point which is a combination of the foregoing to convey utilization, capacity, etc. The abstracted manner can be an indicator, e.g., red, yellow, green, etc. which is an indication of overall status. That is, the client probe 606 is not necessarily interested in the exact CPU utilization percentage, but rather in overall health.

In another embodiment, the probe client 630 can also inform the probe endpoint 606 as well with the maintenance or situational data. That is, the probe client 630 can convey the maintenance or situational data in a similar manner as the probe endpoint 606. This could enable the cloud service provider 602 to have insights into the health of the probe endpoints 606 and perform remedial actions, e.g., proactively shift traffic to a more optimal location. The performance view from edge devices, that are being analyzed to make local forwarding decisions, would be valuable to share with the cloud provider to correlate/analyze. The client feedback could be sent using HTTP POST, and could include latency, packet loss, throughput, etc. The cloud service provider 602 could correlate this data, e.g., 1) geoip lookup customers by source IP, 2) WHOIS source IP to identify ISP, 3) Correlate performance degradation to isolate ISP, locale, . . . etc. With remediation in mind, say performance degradation could be isolated to customers using a specific ISP in a given locale. The cloud service provider 602 could provide remediation instructions to that subset of customers, to establish tunnels to an alternate node/locale (datacenter).

The receipt of the maintenance or situational data can cause events or mitigation at the probe client 630. The detect events can include scheduled maintenance, a security event, an attack, etc. The mitigation can include various actions such as a hard failover, soft failure, reduction in traffic, increase in the frequency of probes, etc. The action can also include a location, e.g., data center, IP address, etc., and a specific date/time. The remedial actions/instructions can be provided explicitly from the cloud service provider 602 to the probe client 602 such as default instructions (e.g., "on failover, switch to datacenter x," etc.), specific instructions (e.g., "there will be maintenance on server y at time t, switchover to server z," etc.), or the like. Such remedial actions/instructions can be in a POST message or the like.

Remedial actions can be taken due to a failure to receive probe responses or based on the maintenance or situational data. The remedial actions can include an alternate service to use, an alternate service endpoint, a start time of when to transition to alternate service/endpoint, an end time of when to transition to alternate service/endpoint, a retry interval, etc. The remedial actions can be defined in the probes or default responses known in advance. The remedial actions can be based on the maintenance or situational data and associated policies at the probe client 630.

Figure 7:
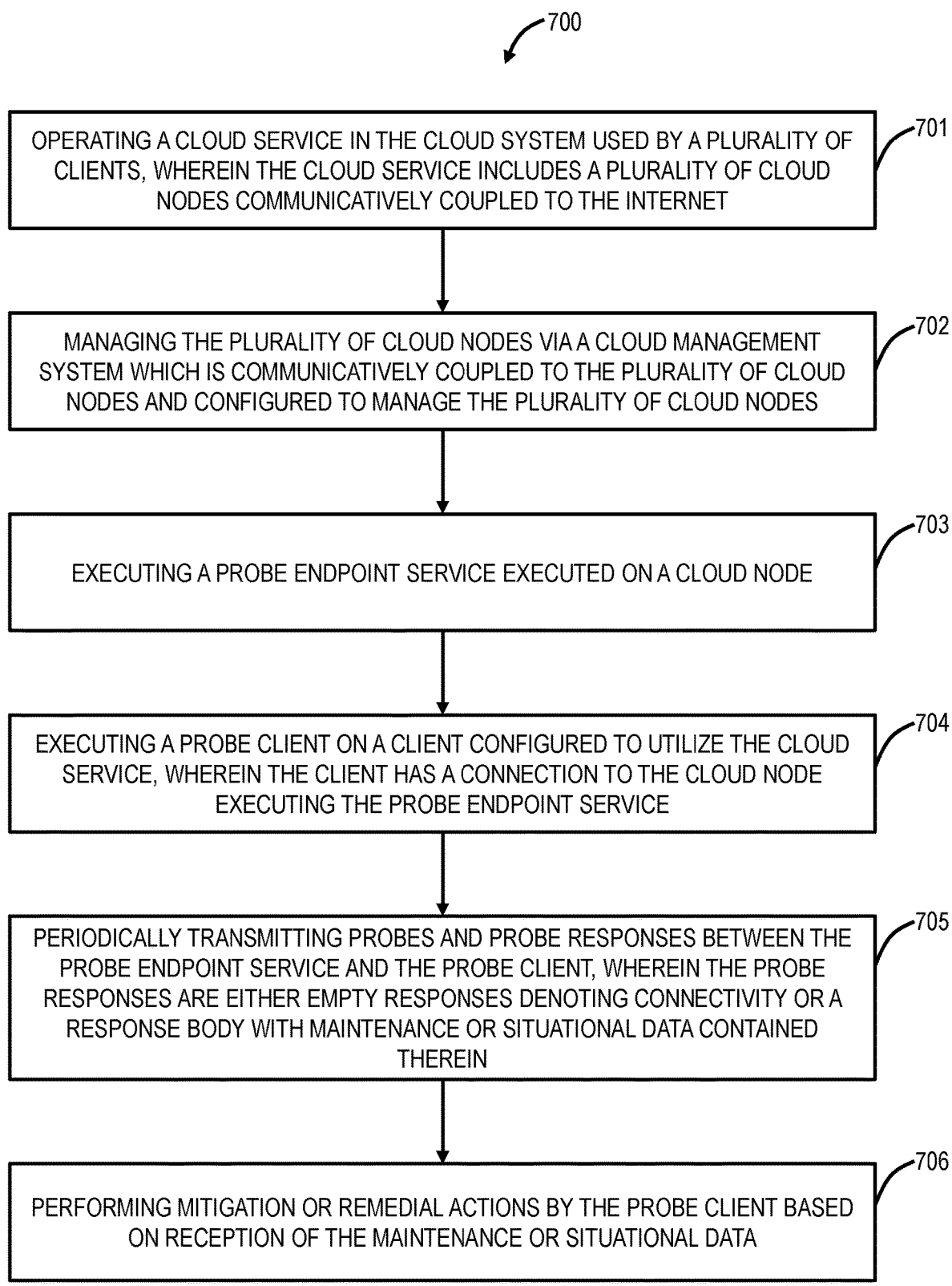
FIG. 7 is a flowchart of a method implemented in a cloud system.

FIG. 7 is a flowchart of a method 700 implemented in a cloud system 100, 500. The method 700 includes operating a cloud service in the cloud system used by a plurality of clients, wherein the cloud service includes a plurality of cloud nodes communicatively coupled to the Internet (step 701); managing the plurality of cloud nodes via a cloud management system which is communicatively coupled to the plurality of cloud nodes and configured to manage the plurality of cloud nodes (step 702); executing a probe endpoint service executed on a cloud node (step 703); executing a probe client on a client configured to utilize the cloud service, wherein the client has a connection to the cloud node executing the probe endpoint service (step 704); periodically transmitting probes and probe responses between the probe endpoint service and the probe client, wherein the probe responses are either empty responses denoting connectivity or a response body with maintenance or situational data contained therein (step 705); and performing mitigation or remedial actions by the probe client based on reception of the maintenance or situational data (step 706).

The probe can be a Hypertext Transfer Protocol (HTTP) GET or HTTP POST request with a Uniform Resource Locator associated with the probe endpoint service. Optionally, the probe is a Hypertext Transfer Protocol (HTTP) GET request with a Uniform Resource Locator associated with the probe endpoint service for continuity checks with the cloud service and an HTTP POST request for obtaining maintenance or situational data from the cloud service. The maintenance or situational data can be in a data-interexchange format that is automatically processed by the probe client.

The maintenance or situational data can be related to compute, networking, storage, power, and service operation, and the probe client utilizes the maintenance or situational data to select an appropriate cloud node for connection thereto. The client can connect to the cloud service via at least two tunnels, and an active tunnel of the at least two tunnels can be selected based on the maintenance or situational data. The maintenance or situational data can include a scheduled maintenance event or a security event.

In another embodiment, a cloud system 100, 500 includes a plurality of cloud nodes 110, 502 communicatively coupled to the Internet 502, wherein the plurality of cloud nodes are configured to implement a cloud service which is used by a plurality of clients; a cloud management system 604 communicatively coupled to the plurality of cloud nodes and configured to manage the plurality of cloud nodes; and a probe endpoint service 606 executed on a cloud node, wherein a client 610, 620 is configured to utilize the cloud service based on a connection between the client and the cloud node executing the probe endpoint service, wherein the client is configured to execute a probe client 630, wherein the probe client is configured to periodically transmit probes to the probe endpoint service and receive probe responses which are either empty responses denoting connectivity or a response body with maintenance or situational data contained therein, and wherein the probe client is configured to perform mitigation or remedial actions based on reception of the maintenance or situational data.

In a further embodiment, a cloud node 110, 502 in a cloud system 100, 500 includes a network interface 306, a data store 308, and a processor 302 communicatively coupled to one another; and memory 110 storing computer executable instructions, and in response to execution by the processor, the computer-executable instructions cause the processor to operate a cloud service in the cloud system used by a plurality of clients, wherein the cloud service is implemented by the cloud node and a plurality of cloud nodes communicatively coupled to the Internet, and wherein the cloud service is managed by a cloud management system which is communicatively coupled to the cloud node and the plurality of cloud nodes; execute a probe endpoint service 606; receive a probe from a client configured to utilize the cloud service executing a probe client 630, wherein the client has a connection to the cloud node executing the probe endpoint service; and transmit a probe response to the probe client in response to the probe, wherein the probe response is either an empty response denoting connectivity or a response body with maintenance or situational data contained therein configured to cause performance of mitigation or remedial actions by the probe client based on reception of the maintenance or situational data.

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device such as hardware, software, firmware, and a combination thereof can be referred to as "circuitry configured or adapted to," "logic configured or adapted to," etc. perform a set of operations, steps, methods, processes, algorithms, functions, techniques, etc. as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A cloud node in a cloud system comprising:
a network interface, a data store, and a processor communicatively coupled to one another; and
memory storing computer executable instructions, and in response to execution by the processor, the computer-executable instructions cause the processor to
operate a cloud service in the cloud system used by a plurality of clients, wherein the cloud service is implemented by the cloud node and a plurality of cloud nodes communicatively coupled to the Internet, and wherein the cloud service is managed by a cloud management system, comprising a second processor and a second memory storing computer executable instructions, and in response to execution by the second processor, the computer-executable instructions cause the second processor to manage the plurality of cloud nodes, which is communicatively coupled to the cloud node and the plurality of cloud nodes;
execute a probe endpoint service;
receive a probe for determining a health and status of the connection with the cloud service from a client configured to utilize the cloud service executing a probe client, wherein the client has a connection to the cloud node executing the probe endpoint service; and
transmit a probe response to signify both the health and the status of the connection to the probe client in response to the probe, wherein (1) in response to maintenance or situational event data not being available, sending the probe response with a structure or a value in a body that signifies an empty response, thereby denoting connectivity to the probe client and (2) in response to maintenance or situational event data being available, sending the probe response with maintenance or situational data contained in the body configured to signify connectivity to the probe client and cause performance of mitigation or remedial actions by the probe client based on reception of the maintenance or situational data and associated policy.

2. The cloud node of claim 1, wherein the probe is a Hypertext Transfer Protocol (HTTP) GET request with a Uniform Resource Locator associated with the probe endpoint service.

3. The cloud node of claim 1, wherein the probe is a Hypertext Transfer Protocol (HTTP) POST request with a Uniform Resource Locator associated with the probe endpoint service.

4. The cloud node of claim 1, wherein the probe is a Hypertext Transfer Protocol (HTTP) GET request with a Uniform Resource Locator associated with the probe endpoint service for continuity checks with the cloud service and the probe is an HTTP POST request for obtaining maintenance or situational data from the cloud service.

5. The cloud node of claim 1, wherein the maintenance or situational data is in a data-interexchange format that is automatically processed by the probe client.

6. The cloud node of claim 1, wherein the maintenance or situational data is related to compute, networking, storage, power, and service operation, and the probe client utilizes the maintenance or situational data to select an appropriate cloud node for connection thereto.

7. The cloud node of claim 1, wherein the client connects to the cloud service via at least two tunnels, and wherein an active tunnel of the at least two tunnels is selected based on the maintenance or situational data.

8. The cloud node of claim 1, wherein the maintenance or situational data comprises a scheduled maintenance event.

9. The cloud node of claim 1, wherein the maintenance or situational data comprises a security event.

10. A method, implemented in a cloud node comprising a processor and memory storing computer executable instructions, the method comprising the steps of:
operating a cloud service in the cloud node used by a plurality of clients, wherein the cloud service is implemented by the cloud node and a plurality of cloud nodes communicatively coupled to the Internet, and wherein the cloud service is managed by a cloud management system, comprising a second processor and a second memory storing computer executable instructions, and in response to execution by the second processor, the computer-executable instructions cause the second processor to manage the plurality of cloud nodes, which is communicatively coupled to the cloud node and the plurality of cloud nodes;
executing a probe endpoint service;
receiving a probe for determining a health and status of the connection with the cloud service from a client configured to utilize the cloud service executing a probe client, wherein the client has a connection to the cloud node executing the probe endpoint service; and
transmitting a probe response to signify both the health and the status of the connection to the probe client in response to the probe, wherein (1) in response to maintenance or situational event data not being available, sending the probe response with a structure or a value in a body that signifies an empty response, thereby denoting connectivity to the probe client and (2) in response to maintenance or situational event data being available, sending the probe response with maintenance or situational data contained in the body configured to signify connectivity to the probe client and cause performance of mitigation or remedial actions by the probe client based on reception of the maintenance or situational data and associated policy.

11. The method of claim 10, wherein the probe is a Hypertext Transfer Protocol (HTTP) GET request with a Uniform Resource Locator associated with the probe endpoint service.

12. The method of claim 10, wherein the probe is a Hypertext Transfer Protocol (HTTP) POST request with a Uniform Resource Locator associated with the probe endpoint service.

13. The method of claim 10, wherein the probe is a Hypertext Transfer Protocol (HTTP) GET request with a Uniform Resource Locator associated with the probe endpoint service for continuity checks with the cloud service and the probe is an HTTP POST request for obtaining maintenance or situational data from the cloud service.

14. The method of claim 10, wherein the maintenance or situational data is in a data-interexchange format that is automatically processed by the probe client.

15. The method of claim 10, wherein the maintenance or situational data is related to compute, networking, storage, power, and service operation, and the probe client utilizes the maintenance or situational data to select an appropriate cloud node for connection thereto.

16. The method of claim 10, wherein the client connects to the cloud service via at least two tunnels, and wherein an active tunnel of the at least two tunnels is selected based on the maintenance or situational data.

17. The method of claim 10, wherein the maintenance or situational data comprises a scheduled maintenance event.

18. The method of claim 10, wherein the maintenance or situational data comprises a security event.

* * * * *